United States Patent
Marinaccio et al.

[11] 3,876,738
[45] Apr. 8, 1975

[54] PROCESS FOR PRODUCING MICROPOROUS FILMS AND PRODUCTS

[75] Inventors: Paul J. Marinaccio, Monroe; Rodney A. Knight, New Milford, both of Conn.

[73] Assignee: AMF Incorporated, White Plains, N.Y.

[22] Filed: July 18, 1973

[21] Appl. No.: 380,403

[52] U.S. Cl. ......... 264/41; 260/2.5 N; 265/DIG. 62
[51] Int. Cl. ............................................. B29d 27/04
[58] Field of Search ................. 264/41, DIG. 62; 260/2.5 N

[56] References Cited
UNITED STATES PATENTS

| | | |
|---|---|---|
| 2,783,894 | 3/1957 | Lovell et al. .................... 260/2.5 N |
| 3,000,757 | 9/1961 | Johnston et al. ................ 264/41 X |
| 3,190,765 | 6/1965 | Yuan ........................ 265/DIG. 62 |
| 3,208,875 | 9/1965 | Holden ........................ 117/135.5 |
| 3,642,668 | 2/1972 | Bailey et al. ................ 265/DIG. 62 |
| 3,699,038 | 10/1972 | Boom ............................. 264/41 |
| 3,703,570 | 11/1972 | Busch et al. ...................... 264/41 |

OTHER PUBLICATIONS

Brydson: Plastics Materials; D. Van Nostrand Co., Inc.; 1966; page 66.

*Primary Examiner*—Lewis T. Jacobs
*Attorney, Agent, or Firm*—George W. Price; Charles J. Worth

[57] ABSTRACT

Microporous films are produced by a process of quenching a polymer solution cast in a quench bath containing a non-solvent system for the polymer to form micropores in the resulting polymer film.

12 Claims, 2 Drawing Figures

PATENTED APR 8 1975 3,876,738

PROCESS FOR PRODUCING MICROPOROUS FILMS AND PRODUCTS

The invention relates to a new process for preparing porous or microporous membranes and the products obtained thereby.

Microporous membranes, or films, are known principally in the filed of filtration, especially in the filtration of fine particles from fluid media, liquid or gas. The films are specifically useful for the removal of particles of less than serveral micrometers in diameter such as required in the filtration of microbiological laboratories. Such membranes, or films, must provide for ready flow of the filtrate and deposit of the filtered material on the surface of the film. Methods of preparing such filters are known, and generally involve the conventional method which requires slow, static gelling of the cast film in a high humidity or controlled atmosphere. For example, U.S. Pat. No. 2,783,894 issued Mar. 5, 1957 describes a method of preparing certain nylon films by casting solutions thereof on an optically smooth surface after which the film is formed by exposing the cast film to an atmosphere of a constantly maintained concentration of non-solvent vapors, the non-solvent being exchangeable with the solvent for the nylon in the cast film. The preferred non-solvent is water and thus the said atmosphere is one containing water vapor, i.e., the atmosphere must be maintained at a constant relative humidity. This process surfaces from a number of disadvantages, among them being the difficulty of maintaining the non-solvent atmosphere for relatively long periods of time required for the film to assume even the properties or a delicate gel structure. The solvent of the cast film must also be rapidly vented from the atomsphere above the film during gelling. Futher, the system described does not easily lend itself to continuous production for commerical exploitation.

U.S. Pat. No. 3,408,315 issued Oct. 29, 1968 describes the use of thickening agents in the nylon solution to be cast to improve the cast layer as to uniformity, continuity and coherence of the layer, but the production process described is substantially the same as that of U.S. Pat. No. 2,783,894.

U.S. Pat. No. 3,429,957 issued Feb. 25, 1969 describes a process of continuously casting a semipermeable membrane by casting a pre-cooled solution of a cellulose ester together with a swelling agent onto a pre-cooled, smooth surface followed by passage of the cooled cast film on the smooth surface through a water bath, after which the film is dried. The resulting film is semi-permeable i.e., permits solvent to pass through but not dissolved matter, i.e., solute. Such semi-permeable membranes require a substantial skin membrane, are anisotropic, and are non-porous, jelly-like materials which function on the basis of molecular diffusion.

In accordance with the present invention, there is provided a novel, simple process for producing microporous membranes, or films, which is an economical, comparatively rapid process, readily controllable and easily adaptable for continuous commerical production. The membranes produced by the present invention are microporous film of outstanding flow characteristic which are reproducible employing the present process in contrast with the prior art process described hereinbefore.

In accordance with the present invention, there is provided a process for preparing microporous films by casting or extruding a solution of a film-forming polymer in asolvent system into a quenching bath which is comprised of a non-solvent system for the polymer to form the microporous film. Although the non-solvent system may comprise only a non-solvent, the solvent system may consist of any combination of materials provided the resultant non-solvent system is capable of setting a film and is not deleterious to the formed film. For example, the non-solvent system may consist of materials such as water/salt, alcohol/salt or other solvent-chemical mixtures. The present process is especially effective when film-forming nylon polymers are employed. The general steps of the present process involve first forming a solution of the film-forming polymer; casting the solution to form a film and quenching the film in a bath which includes a non-solvent for the polymer. By controlled variation of the polymer, the polymer concentration, the solvent system of the casting solution, the age of the polymer solution, the quench bath composition, time of quenching, quench bath temperature additives in both the quench bath and/or the polymer solution, the properties of the resulting film can be altered to desired values with considerable facility.

After removal from the quench bath, the polymeric films can be further processed or treated in accordance with their intended end use. For example, the microporous films are washed to remove traces of solvent and/or non-solvent present and then dried to a sheet-like material from which suitable size filters can then be prepared.

As previously mentioned, the properties of the produced microporous film can be altered by controlling any of the aforementioned parameters. However, the most important parameters responsible for development of micropores in the film are solvent system employed with the polymer and the non-solvent system used in quenching the film. The selection of the solvent for the polymer, according to present knowledge, is determined by the nature of the polymer material used and can be empirically determined on the basis of solubility parameters.

The solubility parameter for any material is defined as the square root of the cohesive energy density $$\delta = \sqrt{\frac{E}{V}}$$

where
$E$ = Heat of vaporization
$V$ = Molar volume
and is a measure of the intermolecular forces in any pure material. A solubility parameter can be assigned (they are tabulated or easily calculated) to most solvents and polymers. Essentially, two materials will be completely miscible if they have the same (or similar) value for their solubility parameter. In practice it is found that materials will dissolve in a certain narrow range of solubility parameter values.

In the case of a good solvent for a particular polymer the solubility parameters will be nearly identical and in solution the polymer chain will assume its most extended configuration. As the solubility parameter of the solvent is changed in either direction, above or below that of the polymer (either by the addition of a third component or by changing the solvent) the polymer chain configuration will become less extended and it will become less and less solubilized. It is this "degree of solution" of polymer in the casting mixture that determines the precipitation point, the formation of aggregates in solutions, chain entanglements and other factors leading to the physical conditions for membrane formation. By selecting materials of the proper solubility parameter, concentration, volatility, etc., casting solutions and processing can be designed to produce desired properties.

Although other factors, such as hydrogen bonding ability, polarity, polymer cyrstallization, have to be considered the above considerations can be applied to practical situations.

A polymer molecule in dilute solution can exist in a variety of conformations. The tendency for macromolecules to assume a tight random coil (spherical) shape can be counteracted in solution by the osmotic effect of the solvent molecules to enter this coil producing an enlargement of extended chain conformation. The degree of openness or extension of the coiled chain depends upon the properties of the solvent and the nature and degree of interactions between solvent molecules and polymer chains. The resulting polymer conformation is reflected in the viscosity of the solution produced with the more extended situation resulting in higher viscosities due to the increased chain interactions (frictional). In a perfect solvent (perfect for the polymer in question) the polymer chains is at its maximum extension. In a poor solvent the random coil is favored. As the solvent power is increased the degree of chain extension is increased.

In addition to the effect on chain conformation in solution the solvent properties can also influence the degree of association of polymer molecules. In dilute solutions and good solvents the polymer chains are relatively unassociated. However, in poor solvent the polymer molecules tend to prefer the environment of other polymer chains. The aggregation tendency of polymer molecules can be measured (via light scattering and other techniques) and the polymer aggregate size has been determined in some cases. Polymer aggregation is also favored in solution by increased polymer concentration. There is generally a critical concentration (2 percent for cellulose acetate in acetone) for the formation of these aggregates. Above this concentration there is a gradual increase in size with increased levels of polymer.

The solubility parameter ($\delta$) is simply the square root of the cohesive energy density and is a measure of the ordering forces present in any material. The magnitude of the difference between the solubility parameters of two components determines their heat of mixing and the free energy of solution (since entropy changes for polymer solutions are large and similar in most cases). For solvent mixtures the resulting mixture solubility parameter can be calculated and is dependent upon the mixture composition and the relative molar volumes and solubility parameters of the components.

$$\delta_{mix} = \frac{\sum_{i}^{n} N_i V_i \delta_i}{\sum_{i}^{n} N_i V_i}$$

where:
 $V$ = molar volume
 $N$ = mole fraction
 $\delta$ = solubility parameter In general a polymer will dissolve in a solvent or solvent mixture having the same solubility parameter value as the polymer. In practice a polymer will dissolve in mixtures of solvents having a range of solubility parameter values, this range being determined mainly by hydrogen bonding tendency, crystallinity, polarity and other specific interactions.

As an ideal case it is now assumed that the tightest or most non-porous polymer film is produced from a solution in which there is no aggregate formation. This would occur when the solvent system has a solubility value and other bonding characteristics essentially the same as those of the polymer.

In this case the resulting film strength is primarily determined by the polymer concentration because of the larger number of chain entanglements occurring at higher polymer levels. In addition for film cast from the ideal solution the "pore size" would increase slightly with polymer concentration because of the increasing aggregation tendency at higher concentrations. Aggregation in solution results in film porosity since the film as cast can be thought to consist of interacting aggregate spherical particles. The larger the sphere the larger the voids in the film. Structurally this is much like a box of tennis balls or other non-spherical geometrics fused at their point of contact.

As a first step then control of flim porosity involves control of the aggregation tendency in the casting solution. This is accomplished in practice by the addition of non-solvent or other additives to change the solvent power of the solution, hence influencing and controlling the aggregation tendency of the polymer molecules. The interaction of these aggregates in determining the resulting film structure is further influenced by the various process variables previously mentioned.

The selection of a solvent for a selected film-forming polymer can be made on the basis of the foregoing information. Determination of optimum solvent systems as well as other process variables can then be made on the basis of routine laboratory experimentation, particularly in view of the more detailed procedures described in the working examples which follow.

The present process differs from conventional methods of preparing microporous films in using more simplified casting solutions, but more importantly in eliminating the slow equilibration step of gelling in a high humidity atmosphere. In conventional processes this is a critical step in the formation of the desired film structure. In the present process the film is cast directly into a quench bath. By controlling the casting solution formulation as discussed above and controlling the quench bath variables including composition and temperature, film structure can be controlled. This method has the advantages of rapidity and is easily made continuous. This technique forms the film struucture catastrophically and is in direct contrast to the slow equilibrium technique needed in conventional processes.

In some cases using the present method it may desirable to pass the cast film through a short air evaporation zone prior to the quench bath. The technique could be used in those cases in which a graded cross-sectional structure is desired in the film.

DESCRIPTION OF THE DRAWINGS

In the accompanying drawings, a continuous film forming apparatus 11 is depicted in FIG. 1 and FIG. 2. The apparatus comprises a dope solution reservoir 10, a casting knife 13, a rotating drum 14, with a smooth, flat surface, a quench bath 12 and 15, a take up drum 16 and a recirculation system, generally designated 19 and consisting of lines 20 and 21 and control valves 22, 23 and 24. Drive means (not shown) are provided for rotating drums 14 and 16 in timed relationship. In the operation of the FIG. 1 apparatus, the dope solution is applied onto drum 14 with the casting knife 13 and is carried into the quench bath 15 to form the microporous film 18 which is carried through the quench bath from the surface of drum 14 to take-up drum 16 where it is wound to predetermined lengths. Drum 16 is preferably a replaceable drum which when filled can be replaced after cutting film 18 by a new take-up drum 16. As the film is cast onto the surface of drum 14, the cast solution 17 can be exposed to evaporative atmosphere to remove solvent and form a slight skin on the exposed surface thereof. However, the operation of FIG. 2 is preferred.

The operation of the FIG. 2 apparatus differs from that of the FIG. 1 apparatus in that the dope solution is cast onto the surface of drum 14 while under the surface of the quench bath so that, as formed, the cast dope solution is immediately quenched by the non-solvent system of the quench bath with no atmosphere contact to form the microporous film 18 which is then carried to take-up drum 16.

Figure 1:
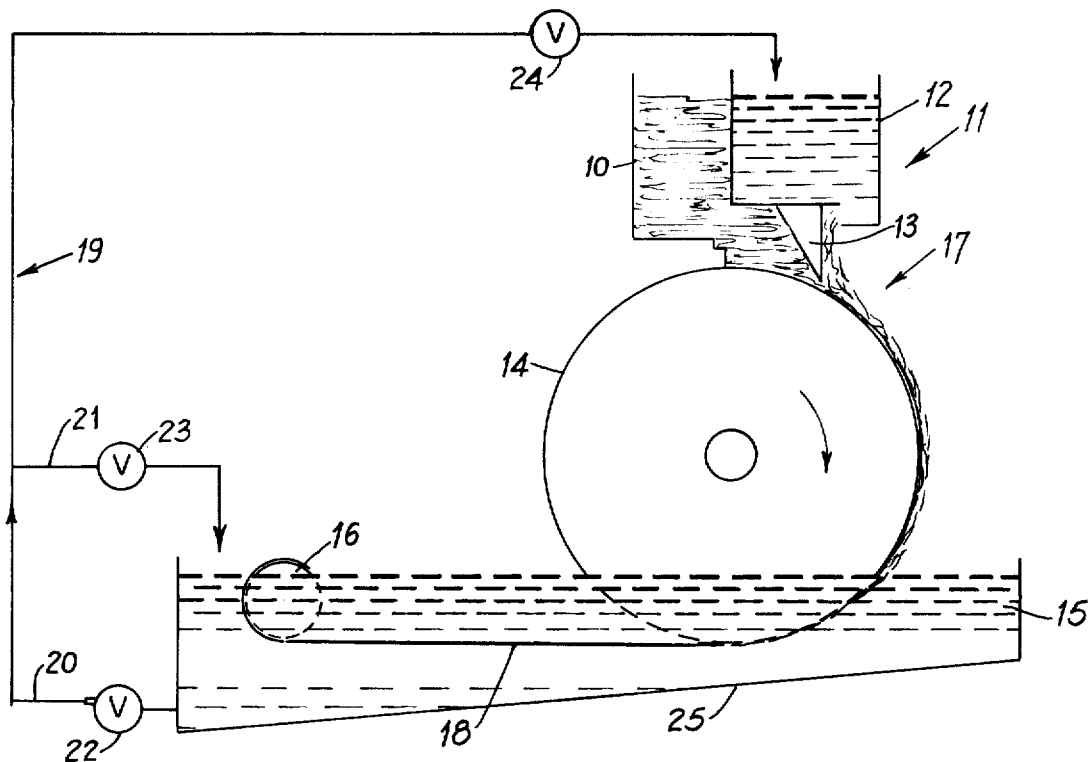

The quench bath vessel 25 is any suitable container which preferably is provided with means for removal of dope solution residue which can accumulate during operation of the apparatus 11. Conveniently, a vessel with a sloped base can be used with a take-off at the deepest point for removal of the dope solution residue, which can be recirculated to the dope solution reservoir, using recirculation system 19 to maintain constant bath composition (not shown in FIG. 2). In addition, means (not shown) for adding the solvent system to the recirculated dope solution residue can be provided.

The quench bath can be replenished with the nonsolvent system employed using any of the known means for replenishment so that the dope solvent concentration does not exceed desirable limits in the quench bath, particularly after long periods of continuous operation.

DESCRIPTION OF PREFERRED EMBODIMENTS

The preferred film-forming polymers are nylon polymers, especially non-alcohol-soluble nylon polymers. Such non-alcohol-soluble polymer are known in the art and can be prepared by accepted techniques. Such polymers are commercially available under the name Plascon (Allied Chem.). Alcohol-soluble nylons may also be used, such as some of the products designated by the name Zytel (Du Pont).

The nylon solutions which can be used in the present process include solutions of nylons in various solvents, such as lower alkanols, e.g., methanol, ethanol and butanol, including mixtures thereof. It is known that nylons will dissolve in solutions of acids in which it behaves as a polyelectrolyte and such solutions are very useful in the present invention. Representative acids include for example, formic acid, citric acid, acetic acid, maleic acid and similar acids which react with nylons through protonation of nitrogen in the amide group characteristic of nylon.

The nylon solutions after formation may be diluted with non-solvent for nylon and the non-solvent employed is miscible with the nylon solution. Of course, dilution with non-solvent can be effected up to the point of incipient precipitation of the nylon but not beyond. The non-solvents are selected on the basis of the nylon solvent utilized. For example, when water-miscible nylon solvents are employed, water can be employed. Generally, the non-solvent can be methyl formate, aqueous lower alcohols, such as methanol and ethanol, polyols such as glycerol, glycols, polyglycols, and ethers and esters thereof, water, and mixtures of such compounds. Moreover, salts can also be used to control solution properties.

After formation, the nylon solution in the selected solvent, preferably comprised of solvent and non-solvent, is sometimes aged before casting. Aging periods can be varied to obtain a variation in the properties of the resulting microporous film but usually are not for excessive periods since the dissolved nylon may tend to separate. In general, aging, when employed, can be extended for as many as 5-8 days and indefinitely in some cases with the preferred nylon solutions.

The quenching bath may or may not be comprised of the same non-solvent selected for preparation of the nylon solution and may also contain small amounts of the solvent employed in the nylon solution. However, the ratio of solvent to non-solvent is lower in the quenching bath than in the polymer solution in order that the desired result be obtained. The quenching bath may also include other non-solvents, e.g., water. As should be apparent, the quenching bath could be composed of non-solvent and/or solvent different from those employed in the formation of the nylon solution. The selection of non-solvent and, when present, solvent is preferably based on mutual miscibility with the solvent and, when present, non-solvent of the nylon solution.

Figure 2:
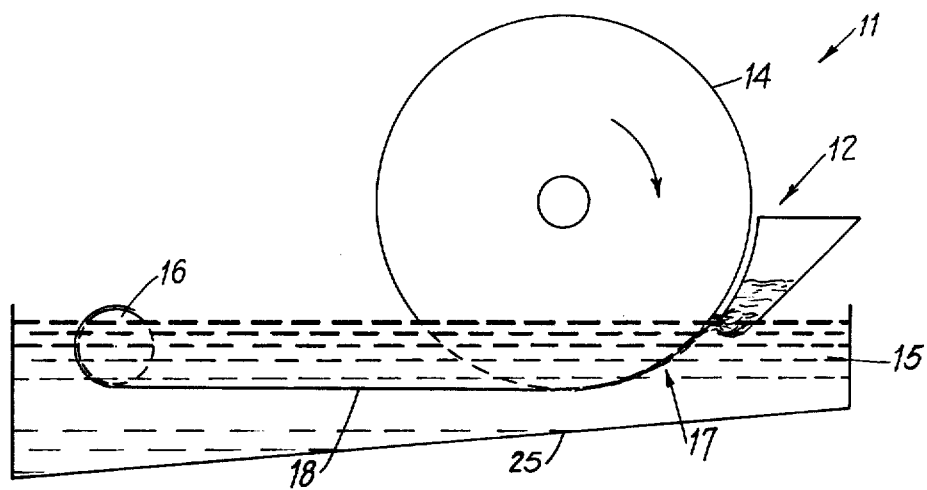

The formation of the polymer film can be accomplished by any of the recognized methods familiar to the art. The preferred method is casting using a knife edge which controls the thickness of the cast film. The thickness of the film will be dictated by the intended use of the microporous product and the requirements. In general, the films will be cast at thicknesses in the range of from 0.003 in. to 0.020 in. preferably about 0.01 in. Although any suitable apparatus may be employed in producing the present films, the apparatus of FIGS. 1 and 2 are preferred particularly the apparatus of FIG. 2, wherein the polymer solution is cast and simultaneously quenched. In the preferred form of the invention, the apparatus of FIG. 1 can be adapted to provide equivalent results when provided with means for maintaining an atmosphere saturated in the nylon solvent system in the area above the surface of the cast solution to prevent evaporation from the surface.

After the polymer solution is cast and quenched, it is removed from the quench bath and preferably washed free of solvent and/or non-solvent. Subsequently the film can be dried, annealed, treated with wetting agent, solvent equilibrated or treated with plasticizers to provide the necessary additional properties required by the end use.

The present process does not require special conditions of temperature or pressure. Since the films can be conveniently produced at or near room temperature, it is usually preferred to operate at room temperature and normal pressure, particularly when employing solvents which are readily volatilized. Where necessary, lower or higher temperatures can be employed for whatever reason e.g., in dissolving the polymer in the solvent, it is convenient to heat the mixture to aid in solution formation. However, in casting of the film and quenching step no particular advantage is had in operating at temperatures other than room temperature for which reason room temperature is preferred particularly in continuous commercial production.

The following examples are illustrative of the invention:

EXAMPLE 1

40 g of A-8205 Nylon (Allied) is dissolved in formic acid (100 cc.) to which is added 25 cc. of methanol. The resulting solution is cast into a quench bath consisting of 50/50 methanol-water and the film residence time in the bath of 1.5–2.0 minutes. The pore size of the film is 1.00 micrometer.

EXAMPLE 2

The procedure of Example 1 is repeated using a mixture of 38 cc methyl formate and 11 cc. $H_2O$ in lieu of the 25 cc methanol in making up the nylon solution. The pore size of the film is 1.00 micrometer.

EXAMPLE 3

The procedure of Example 2 is repeated using 30/70 methanol-water as the quench bath with the resulting film having a pore size of 0.22 micrometer.

EXAMPLE 4

The procedure of Example 1 is repeated using 14cc glycerol in lieu of the 25 cc of methanol in making up the nylon solution. The pore size of the resulting film is 1.20 micrometers.

EXAMPLE 5

The procedure of Example 1 is repeated using 20 cc in lieu of 25 cc of methanol in making up the nylon solution and the quench bath is 30/70 methanol-water. The pore size of the resulting film is 0.22 micrometer.

EXAMPLE 6

Using the procedure of Example 1, nylon solution concentrations, non-solvent levels, and quench bath concentrations are varied to determine the effect on films produced therewith. The results are given in table 1 in which the response of the film is measured in terms of the foam all over point (FAP) which is measured in pounds per sq. in gas.

TABLE I

| Response FAP PSIG | A Gms* Polymer/ 100 cc F.A. | B cc Non-Solv./ 100 cc F.A. | C Quench** % MeOh |
| --- | --- | --- | --- |
| 125 | 35 | 20 | 30 |
| 51 | 45 | 20 | 30 |
| 88 | 35 | 30 | 30 |
| 36 | 45 | 30 | 30 |
| 1.5 | 35 | 20 | 70 |
| 25 | 45 | 20 | 70 |

TABLE I-Continued

| Response FAP PSIG | A Gms* Polymer/ 100 cc F.A. | B cc Non-Solv./ 100 cc F.A. | C Quench** % MeOh |
| --- | --- | --- | --- |
| 6 | 35 | 30 | 70 |
| 58 | 45 | 30 | 70 |
| 125 | 35 | 20 | 30 |
| 88 | 35 | 30 | 30 |
| 51 | 45 | 20 | 30 |
| 36 | 45 | 30 | 30 |
| 1.5 | 35 | 20 | 70 |
| 6 | 35 | 30 | 70 |
| 25 | 45 | 20 | 70 |
| 58 | 45 | 30 | 70 |
| 125 | 35 | 20 | 30 |
| 1.5 | 35 | 20 | 70 |
| 51 | 45 | 20 | 30 |
| 25 | 45 | 20 | 70 |
| 88 | 35 | 30 | 30 |
| 6 | 35 | 30 | 70 |
| 36 | 45 | 30 | 30 |
| 58 | 45 | 30 | 70 |

*nylon in formic acid
**water/methanol mixture

EXAMPLE 7

The procedure of Example 1 is repeated with Nylon-6 and Zytel-31 Nylon (Du Pont) with similar results.

EXAMPLE 8

A solution of 15 gm. of polystyrene in 40 cc of methyl ethyl ketone with 5 cc of isopropyl alcohol was cast on a glass plate and immediately quenched in ethanol at room temperature. When equilibrated with water the resulting film was permeable to water. When this polymer solution was quenched in hexane at room temperature the resulting film was permeable to hexane.

The microporous films produced in accordance with the foregoing examples are at least as effective for filtration as those produced in accordance with the prior art method of casting and maintaining in controlled atmosphere for extended periods. Generally, the present films exhibit better flow rates and are more readily wettable than the prior art films.

The response of microporous films can be measured in terms of the foam all over point which is the pressure required to cause foam to develop over the surface of the film. This method is commonly employed in this art.

The films as produced by the present process are usually of the same order of thickness in wet or dry state. Generally, the shrinkage in drying is only about 5–10 percent and in many cases even less than 5 percent. Tensile strength of the present films range in the order of 500–1,000 psi.

As is apparent, the casting of the prepared polymer solutions can be varied to produce hollowed continuous tubes by extrusion of the solution through a hollow tube die, e.g., floating injection mandrel in an orifice, using wet-spinning techniques, into a quenching bath. The system can be provided with an air gap to expose the extruded solution to a controlled environment. The hollow continuous tube walls would have a porosity dictated by control of variables previously mentioned. By controlling the interior and exterior quenching independently a tube of graded cross sectional porosity can be prepared. The hollow tubes can be used to produce a microporous filter cartridge having high dirt-loading capacity. The cartridge can be formed by winding around a cylinder the hollow tubes, or bundles thereof, in a controlled fashion to produce a graded density from the center of the wound cylinder to the outer edges, maximum density being at the centerpoint of the cylinder. The porosity resulting from air gaps produced by random orientation of the fibers during winding creates the depth filtration properties while the fiber porosity determines fine filtration capacity. The resulting tube bundle ends can be suitably filled as with epoxy resin and cut exposing the fibers interior. The center hole would serve as the outlet of the cartridge.

As employed in this disclosure and the appended claims, the term "nylon" is intended to embrace film-forming polyamide products including copolymers and terpolymers which include the characteristic recurring "amido" grouping typified by the well-known nylon product which is the condensation product of hexamethylenediamine and adipic acid.

While the invention has been described in specific details with reference to the preferred nylon film-formers, it is also useful with other film-forming polymers such as polystyrene and cellulose acetate.

By application of the general and specific information provided hereinbefore, e.g., solubility parameter, the selection of appropriate solvents, non-solvents and processing conditions for any given polymer is a matter of routine laboratory procedures and testing.

Many variations of the invention suggest themselves to those skilled in the art in view of the foregoing disclosure without departing from the spirit and scope of this invention.

What is claimed is:

1. A process for preparing a microporous membrane which comprises preparing a dope solution of a film-forming polymer in a solvent system and directly casting said solution under the surface of a quenching medium comprising a non-solvent system for said polymer for a time sufficient to form micropores in said film.

2. A process according to claim 1 wherein the film-forming polymer is a nylon.

3. A process according to claim 2 wherein the nylon is alcohol-soluble.

4. A process according to claim 2 wherein the solvent is formic acid.

5. A process according to claim 1 wherein the solvent system is a mixture of at least one solvent and one non-solvent for the polymer, the amount of non-solvent being insufficient to cause precipitation of the polymer.

6. A process according to claim 5 wherein the polymer is a nylon and the solvent system comprises formic acid and methanol.

7. A process according to claim 5 wherein the polymer is a nylon and the solvent system comprises formic acid, methyl formate and water.

8. A process according to claim 1 wherein the polymer is a nylon, and the solvent system comprises a mixture of formic acid and glycerol.

9. The process according to claim 5, wherein the quenching medium also comprises a solvent for said polymer, wherein the ratio of solvent to non-solvent is lower in the quenching medium than in the polymer solution.

10. A process according to claim 1, wherein the polymer is a nylon, and the quench bath non-solvent system is a mixture of methanol and water.

11. A process for preparing a microporous membrane comprising preparing a dope solution of a nylon polymer in a solvent system comprising a mixture of at least one solvent and one non-solvent for the polymer, the amount of non-solvent being insufficient to cause precipitation of the polymer, said solvent being formic acid and said non-solvent being selected from the group consisting of methanol, methyl formate/water, and glycerol, directly casting said solution under the surface of a quenching bath comprising a non-solvent system for said polymer for a time sufficient to form micropores in said film, said non-solvent system being a mixture of methanol and water.

12. The process of claim 11, wherein the mixture of methanol and water forming the non-solvent system ranges in proportion from 30/70 to 50/50.

* * * * *